US007755796B1

(12) United States Patent
Phillips et al.

(10) Patent No.: US 7,755,796 B1
(45) Date of Patent: Jul. 13, 2010

(54) METHOD AND APPARATUS FOR SELECTIVELY CONVERTING COLOR VALUES IN A DOCUMENT

(75) Inventors: Matthew J. Phillips, Champaign, IL (US); Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1061 days.

(21) Appl. No.: 11/369,349

(22) Filed: Mar. 7, 2006

(51) Int. Cl.
*H04N 1/60* (2006.01)
*G03F 3/08* (2006.01)
(52) U.S. Cl. .................................. 358/1.9; 358/518
(58) Field of Classification Search .............. 358/1.9, 358/518, 1.1, 1.2, 1.4, 1.5, 1.6, 2.1, 1.13, 358/1.15, 1.18, 500, 501, 515, 517, 519, 358/523, 527, 530; 345/589, 600, 597, 89, 345/88; 382/162, 163, 164, 165, 166, 167; 715/200, 273, 274, 275; 399/1, 28, 39, 112, 399/184, 321, 344; 347/2, 3, 5, 24, 43, 115, 347/172, 178, 232
See application file for complete search history.

(56) References Cited

U.S. PATENT DOCUMENTS

| | | | |
|---|---|---|---|
| 5,257,097 A | 10/1993 | Pineau et al. | |
| 5,754,184 A | 5/1998 | Ring et al. | |
| 5,835,098 A * | 11/1998 | Lipton | .......................... 345/589 |
| 5,872,895 A * | 2/1999 | Zandee et al. | ................. 358/1.9 |
| 6,088,038 A | 7/2000 | Edge et al. | |
| 6,175,663 B1 | 1/2001 | Huang | |
| 6,373,531 B1 | 4/2002 | Hidaka et al. | |
| 6,930,690 B1 * | 8/2005 | Kulkarni | ....................... 345/589 |
| 2002/0124027 A1 * | 9/2002 | Krueger et al. | ............... 707/528 |
| 2003/0047099 A1 * | 3/2003 | Hanyu | ......................... 101/484 |
| 2006/0056683 A1 * | 3/2006 | Komatsu | ..................... 382/162 |
| 2006/0244983 A1 | 11/2006 | Zeng | |
| 2006/0274342 A1 | 12/2006 | Haikin et al. | |
| 2006/0274387 A1 | 12/2006 | Hoshino | |

OTHER PUBLICATIONS

JDF Specification. Published by CIP4, Release 1.1, 2002, pp. 245-248.*
D.J. Littlwood, P.A. Drakopolous, G. Subbarayan, "Pareto-optimal formulations for cost versus colorimetric accuracy trade-offs in printer color management", Apr. 2002 ACM Transactions on Graphics, vol. 21, Issue 2.

* cited by examiner

*Primary Examiner*—Dov Popovici
(74) *Attorney, Agent, or Firm*—Robert C Kowert; Meyertons, Hood, Kivlin, Kowert & Goetzel, P.C.

(57) ABSTRACT

A system that selectively converts color values for objects within a document based on color profiles, wherein a color profile defines a conversion for color values between a source color space and a destination color space. During operation, the system determines whether an object-level color profile exists for an object in a document. If so, the system determines whether an object-level flag for the object is set to honor the object-level color profile. If so, the system uses the object-level color profile and an output color profile to convert color values for the object in the document.

21 Claims, 4 Drawing Sheets

METHOD AND APPARATUS FOR SELECTIVELY CONVERTING COLOR VALUES IN A DOCUMENT

BACKGROUND

1. Field of the Invention

The present invention relates to techniques for selectively converting color values in a document based on color profiles.

2. Related Art

Color management systems (CMSs) attempt to ensure that color values which are displayed on one output device appear the same when the color values are displayed on a different output device. To accomplish this, CMSs use color profiles, which describe how a given output device reproduces color, to ensure that color values are properly converted for the given output device. Given two color profiles for different output devices, a set of color values that represent a given color on one device can be converted to a corresponding set of color values that represent the same color on another device.

Color values are defined with reference to different "color spaces," such as XYZ, LAB, RGB, and CMYK. Moreover, different color spaces are used for different applications. For example, CMYK is typically used for outputting colors to a print device, whereas RGB is typically used for displaying colors on a computer display.

Any difference between a source color profile and a destination color profile typically causes a CMS to convert color values in the source color space to color values in the destination color space. For example, when printing an image which has color values defined in the RGB color space (for an RGB computer display) to a CMYK printer, the CMS can use the color profiles for the RGB computer display and the CMYK printer to convert color values from the RGB color space to color values in the CMYK color space for the CMYK printer.

A CMS typically converts color values between color spaces by first converting the color values from the first color space to color values in a device-independent color space, such as XYZ. The CMS then converts the device-independent color values to color values in the second color space using the second color profile.

In some situations, it is undesirable to use color profiles to convert color values from one color space to another color space. For example, if the first and second color profiles both describe CMYK color spaces (with four color channels) for the same output device, but the two color profiles differ slightly from each other, the conversion from a four-channel color space to a three-channel device-independent color space, and back into a four-channel color space results in a loss of color information. In this case, the conversion to the three-channel device-independent color space is undesirable because color information is lost. Note that the CMS has no way to determine that the two slightly different color profiles are for the same output device.

A similar problem occurs when text within a document is represented by a single plate (typically black) in the CMYK color space. If the document-level CMYK color profile is slightly different than the output color profile, the CMS converts the CMYK text using the color profiles. This can cause the black text to contribute to multiple plates, thereby causing registration problems.

One approach for avoiding conversions of CMYK color values during printing and export is to disable color management features entirely. As a result, any non-CMYK content must be converted in its originating application. For example, RGB images would need to be converted to CMYK images in a program such as Adobe® Photoshop®. Failing to do so can result in very poor color accuracy for those images. Furthermore, disabling color management features is not desirable because useful color management features are lost, particularly color proofing, where an onscreen representation of the final printed document can be used for making color decisions.

Another approach is to leave color management enabled but to carefully check all color management settings to ensure that color profiles have not been inadvertently assigned or inherited. Unfortunately, the time required to do this is typically proportional to the complexity and size of the document. Furthermore, the checking process is error-prone. Commercial "preflight" programs, which mechanically inspect documents for inadvertent color settings that could cause conversions, can be used to check documents. Unfortunately, these programs can tie the user into a particular graphics program version or workflow, and can be expensive to purchase and maintain.

However, there are situations when color conversions between the same or similar color spaces are desirable. For example, consider a CMYK document which is to be printed on both an offset press and a newspaper press. The CMYK document was originally created for printing on an offset press. Since the paper used in a newspaper press has less ink capacity than the paper used in an offset press, the color values for the CMYK document need to be converted before the document is printed on the newspaper press.

Hence, what is needed is a method and an apparatus for selectively avoiding color conversions without the problems described above.

SUMMARY

One embodiment of the present invention provides a system that selectively converts color values for objects within a document based on color profiles, wherein a color profile defines a conversion for color values between a source color space and a destination color space. During operation, the system determines whether an object-level color profile exists for an object in a document. If so, the system determines whether an object-level flag for the object is set to honor the object-level color profile. If so, the system uses the object-level color profile and an output color profile to convert color values for the object in the document.

In a variation on this embodiment, if a print-mode flag indicates that color values should be preserved for CMYK objects, the system does not convert the color values for CMYK objects that have object-level flags set to not honor associated object-level color profiles and for CMYK objects without object-level color profiles.

In a variation on this embodiment, wherein if a print-mode flag indicates that color values should not be preserved for CMYK objects, the system uses a document-level CMYK color profile associated with the document and the output color profile to convert color values for CMYK objects that have object-level flags set to not honor associated object-level color profiles and for CMYK objects without object-level color profiles.

In a variation on this embodiment, while using the output color profile to convert color values for objects, the system performs the conversion only if the object-level color profile for a given object differs from the output color profile.

In a variation on this embodiment, the system inserts an object into the document. If the object is a CMYK object, the system automatically sets an object-level flag for the inserted object so that an associated object-level color profile for the inserted object will not be honored. Otherwise, if the object is a non-CMYK object, the system automatically sets the object-level flag for the inserted object so that the associated object-level color profile for the inserted object is honored.

In a further variation, when the system receives an indication that an object-level color profile for a given object is to be honored, the system sets the object-level flag for the given object so that the object-level color profile for the given object is honored.

In a variation on this embodiment, the output color profile is a color profile associated with a printer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Color-Management System

Figure 1:
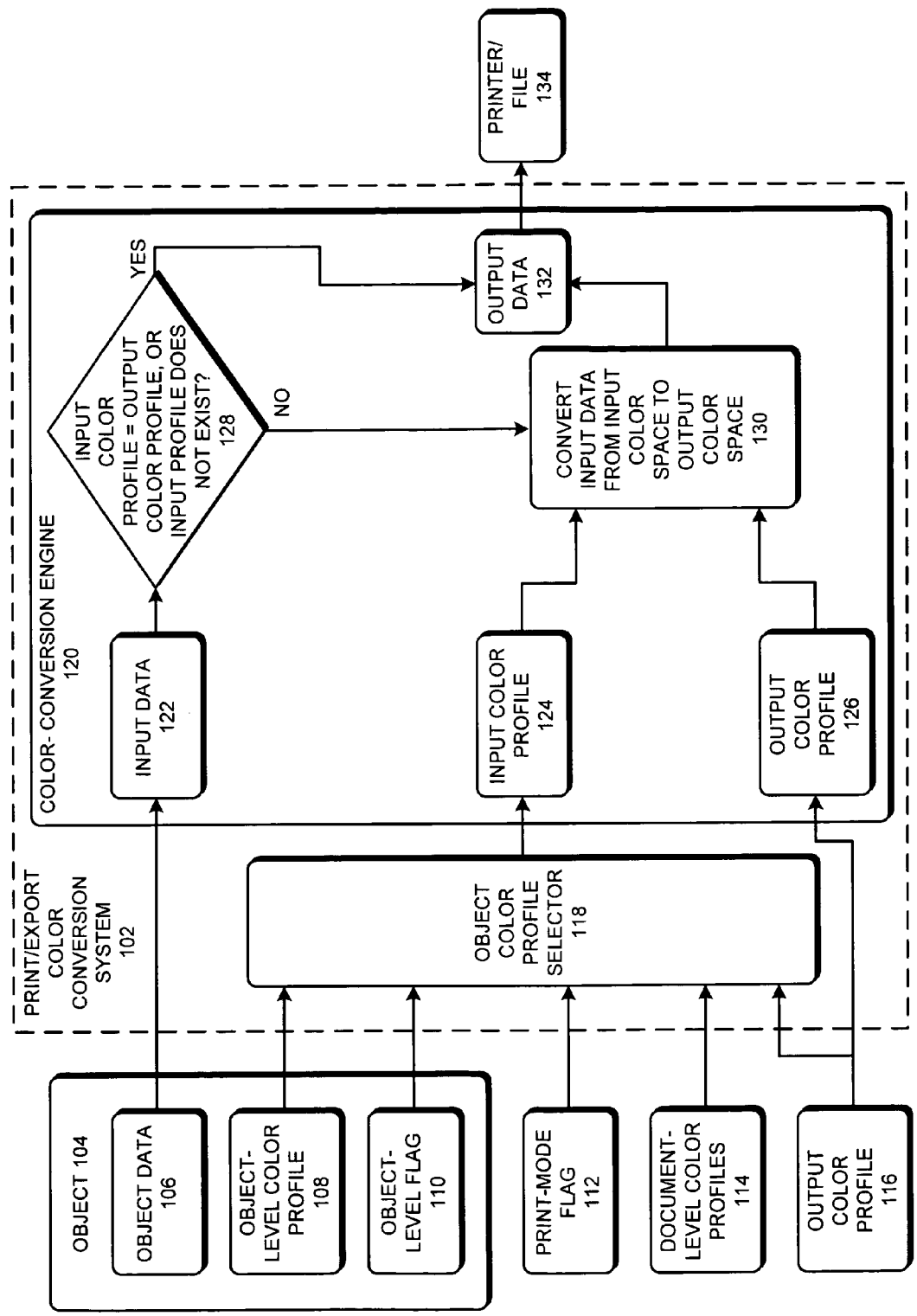
FIG. 1 presents a block diagram illustrating the inputs and outputs to a print/export color-conversion system in accordance with an embodiment of the present invention.

FIG. 1 presents a block diagram illustrating the inputs and outputs to a print/export color-conversion system 102 in accordance with an embodiment of the present invention. Print/export color-conversion system 102 takes object 104, print-mode flag 112, document-level color profiles 114, and output color profile 116 as inputs, and generates output data 132 which is sent to printer/file 134. Object 104 includes object data 106, object-level color profile 108 and object-level flag 110.

Object profile selector 118 determines whether to use object color profile 108, document-level color profiles 114, or output color profile 116 as input color profile 124 based on the state of object-level flag 110 and the state of print-mode flag 112. Object color profile selector 118 is discussed in detail below. In one embodiment of the present invention, object 104 is a CMYK object or an RGB object. Note that for clarity, the discussion in this specification is generally directed to protecting a CMYK color model. However, the present invention can be extended to protect any color model. In one embodiment of the present invention, object 104 is an object which is imported into a document from an external source. In another embodiment of the present invention, object 104 is an object which is created within the document (i.e. an object that is not imported from an external source). In this embodiment, object-level color profile 108 is not used. Instead, the object inherits the document-level color profile or the output color profile. In other embodiments of the present invention, object 104 is text, an image, a line, a shape, a document, or another file.

In one embodiment of the present invention, document-level color profiles 114 includes a CMYK color profile and an RGB color profile.

In one embodiment of the present invention, for a given object, the object-level flag indicates whether the object-level color profile is to be honored or not.

Color-conversion engine 120 operates as a typical color-conversion engine operates. Note that object data 106 is input data 122 and output color profile 116 is output color profile 126. Color-conversion engine 120 then determines if input color profile 124 is the same as output color profile 126, or if the input color profile does not exist (decision box 128). If so, input data 122 is output directly as output data 132 to printer/file 134 without conversion. Otherwise, color-conversion engine 120 converts the color values for input data 122 to color values in the output color space using input color profile 124 and output color profile 126 to produce output data 132.

In one embodiment of the present invention, the state of print-mode flag 112 determines whether the color space specified in document-level color profiles 114 or the color space specified in output color profile 116 is to be used as the default source color space for objects which have the object-level flag set to not honor the object-level color profile. As described below, print-mode flag 112 also determines whether input CMYK color values should be converted or preserved.

Object Color Profile Selector

Figure 2A:
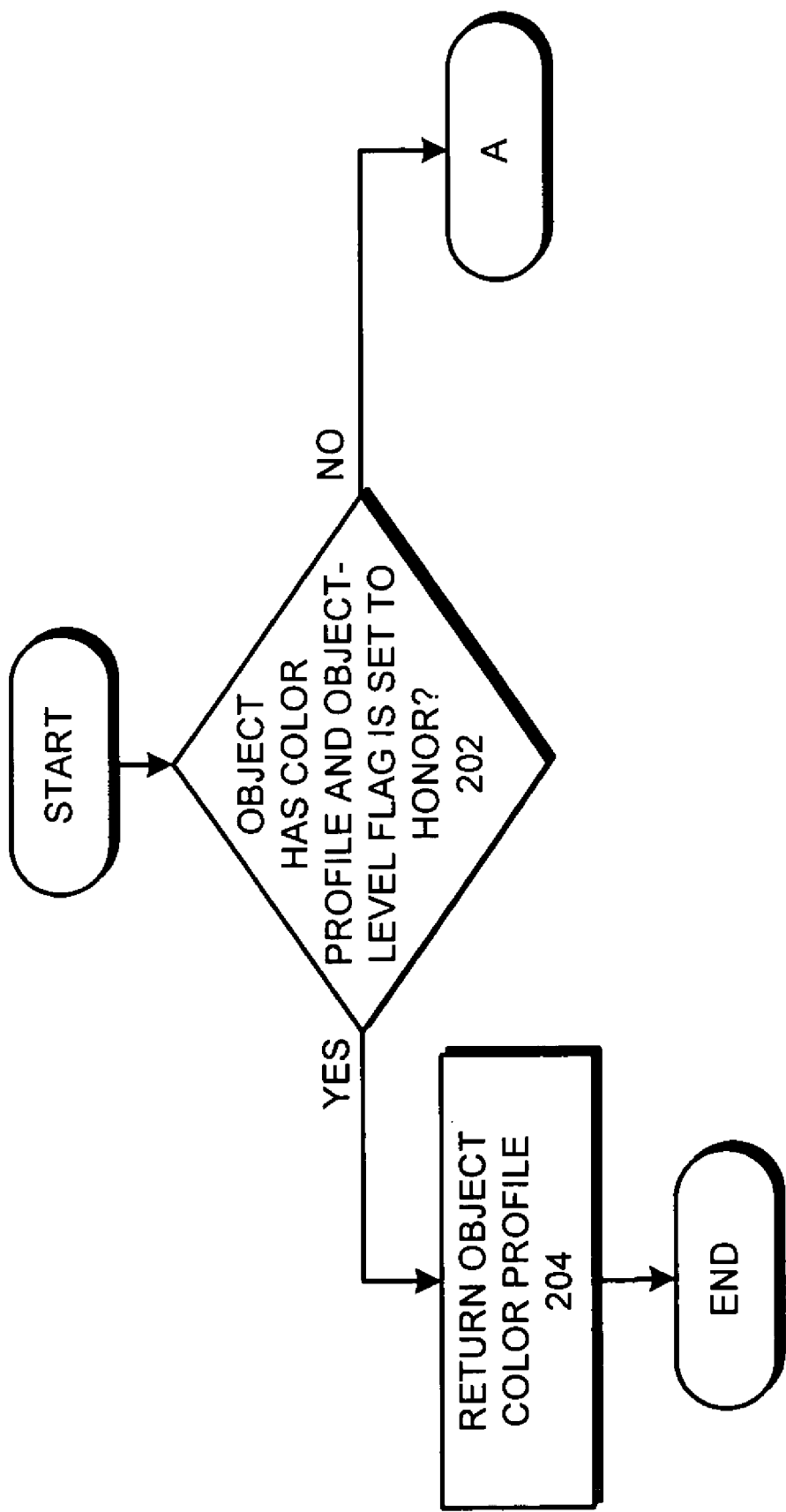
FIG. 2A presents a flow chart illustrating the process of selecting a color profile for objects in accordance with an embodiment of the present invention.
Figure 2B:
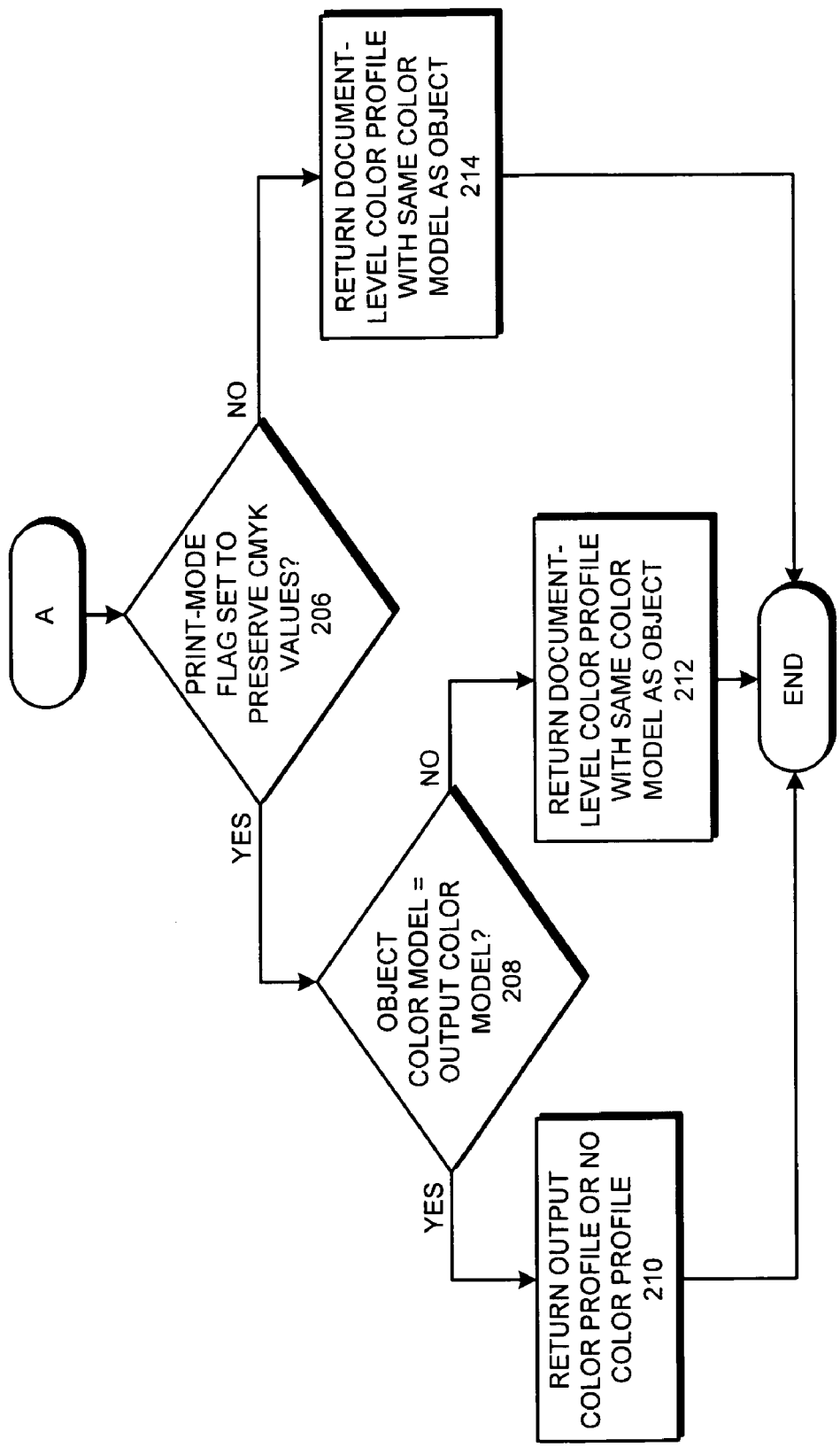
FIG. 2B continues the flow chart presented in FIG. 2A illustrating the process of selecting a color profile for objects in accordance with an embodiment of the present invention.

FIGS. 2A-2B illustrate the process that object color profile selector 118 in FIG. 1 uses to determine which color profile to use as input color profile 124.

FIG. 2A presents a flow chart illustrating the process of selecting a color profile for objects in accordance with an embodiment of the present invention. The process begins when the system determines whether the object has an object-level color profile and if the object-level flag for the object is set to honor the object-level color profile (step 202). If so, the system returns the object-level color profile (step 204). Otherwise, the process continues to A in FIG. 2B.

FIG. 2B continues the flow chart presented in FIG. 2A illustrating the process of selecting a color profile for objects in accordance with an embodiment of the present invention. The process continues at A from FIG. 2A. The system determines whether the print-mode flag is set to preserve CMYK color values (step 206). If so, the system determines if the object color model is the same as the output color model (step 208). (Note that the term "color model" refers to a color space such as CMYK, RGB, XYZ, LAB, etc.) If so, the system returns the output color profile or no color profile (step 210). Otherwise, the system returns the document-level color profile with the same color model as the object (step 212). For example, if the color model for the object is CMYK, the system returns the CMYK document-level color profile. In step 206, if the print-mode flag is not set to preserve CMYK color values, the system returns the document-level color profile with the same color model as the object (step 214).

In one embodiment of the present invention, the color values for a given object are converted only if a color profile is returned from the object profile selector and if this color profile is different from the output color profile.

In one embodiment of the present invention, the output color profile is a color profile that is associated with a printer.

Figure 3:
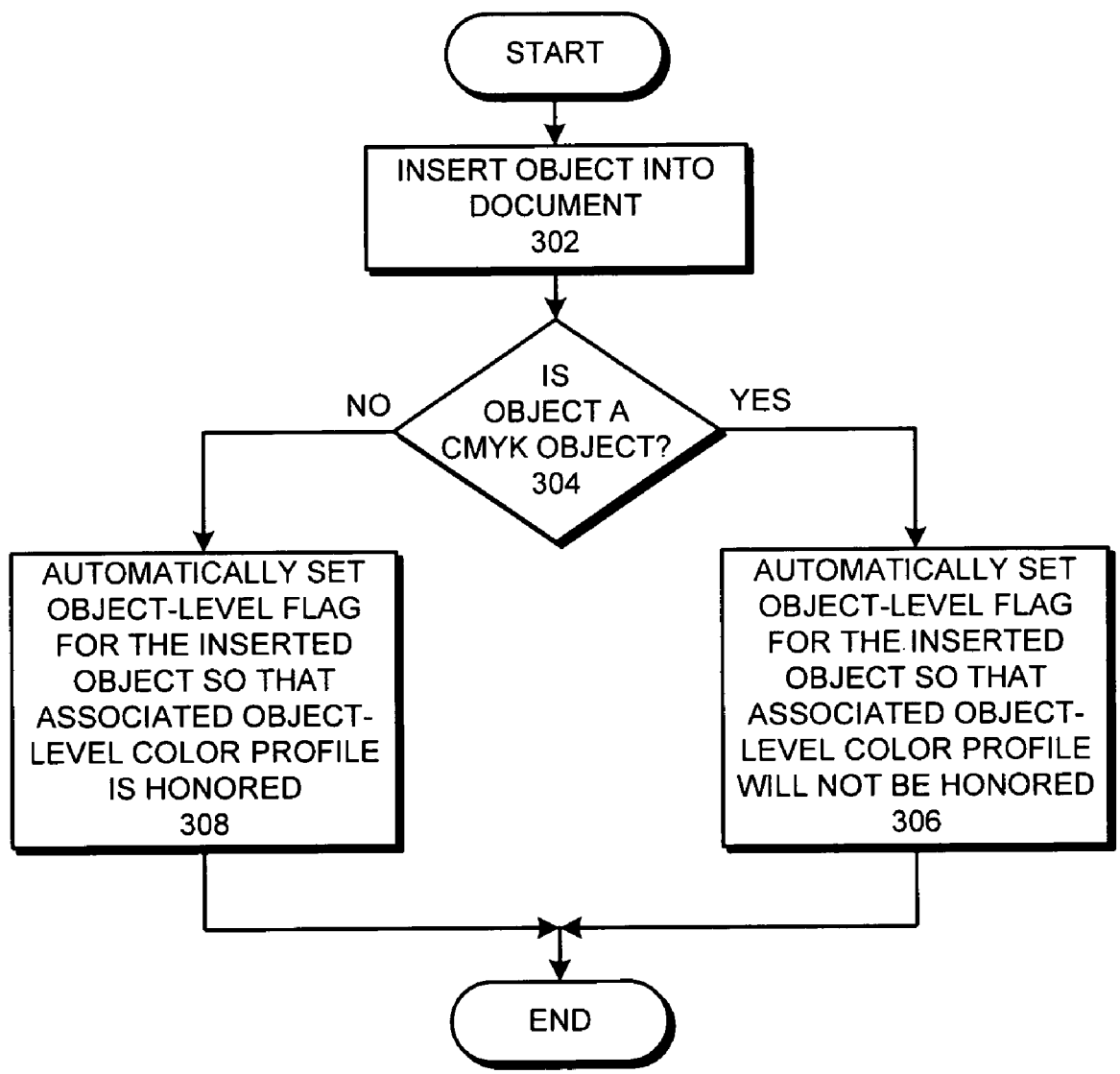
FIG. 3 presents a flow chart illustrating the process of inserting objects into a document in accordance with an embodiment of the present invention.

FIG. 3 presents a flow chart illustrating the process of inserting objects into a document in accordance with an embodiment of the present invention. The process begins when the system inserts an object into the document (step 302). Next, the system determines whether the object is a CMYK object (step 304). If so, the system automatically sets an object-level flag for the inserted object so that an associated object-level color profile for the inserted object will not be honored (step 306). On the other hand, if the object is a non-CMYK object, the system automatically sets the object-level flag for the inserted object so that the associated object-level color profile for the inserted object is honored (step 308). In one embodiment of the present invention, the user can select a default behavior for automatically setting the object-level flag for newly-inserted CMYK and RGB objects. For example, a user can select a default behavior in which the object-level flag for newly-inserted CMYK objects is set to honor the object-level color profile and the user can select a default behavior in which the object-level flag for newly-inserted RGB objects is set to not honor the object-level color profile.

In one embodiment of the present invention, if the color profile for a given object is to be honored, the object-level flag for the given object is set so that the object-level color profile for the given object is honored. Note that setting the object-level flag for the given object so that the object-level color profile for the given object is honored causes the color values for the given object to be converted to color values in the output color space if the output color profile is different than the object-level color profile.

The combination of object-level flags and the print-mode flag allows a user to specify which objects within a document should be converted and which objects within the document should not be converted. For example, consider a situation in which a document is to be printed on a newspaper press. The document was originally created for a medium which requires more ink than the newspaper paper can hold (e.g. an offset press). If the object-level flag is set to not honor the object-level color profile for each object in the document, and if the print-mode flag indicates that CMYK values are to be preserved, the objects in the document will not be converted. In other words, objects with object-level flags set to not honor the object-level color profile are associated with the output color profile at print-time. Note that no conversion of color values occurs when the objects are associated with the output color profile. However, since the newspaper paper holds less ink, the color values for the objects should be converted. Hence, to force a conversion, the object-level flags are manually set such that the object-level color profiles are honored. If the object-level color profiles are different than the output color profile, the CMS converts color values for the objects to the output color space.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for selectively converting color values for objects within a document based on color profiles, wherein a color profile defines a conversion for color values between a source color space and a destination color space, wherein the method comprises:

performing by a computer:
  determining whether an object-level color profile exists for an object in the document;
  in response to determining that an object-level color profile does exist for the object in the document, determining whether an object-level flag for the object is set to honor the object-level color profile; and
  in response to determining that the object-level flag for the object is set to honor the object-level color profile, using the object-level color profile and an output color profile to convert color values for the object in the document.

2. The method of claim 1, further comprising:
in response to determining that a print-mode flag indicates that color values should be preserved for an additional set of objects comprising a plurality of CMYK objects, not converting the color values for the CMYK objects that have object-level flags set to not honor associated object-level color profiles and for the CMYK objects without object-level color profiles.

3. The method of claim 1, further comprising:
in response to determining that a print-mode flag indicates that color values should not be preserved for an additional set of objects comprising a plurality of CMYK objects, using a document-level CMYK color profile associated with the document and the output color profile to convert color values for the CMYK objects that have object-level flags set to not honor associated object-level color profiles and for the CMYK objects without object-level color profiles.

4. The method of claim 1, further comprising:
using the output color profile to convert color values for an additional object having an object-level color profile that differs from the output color profile.

5. The method of claim 1, further comprising:
inserting an additional object into the document; and
in response to determining that the additional object is a CMYK object, automatically setting an object-level flag for the additional object so that an associated object-level color profile for the additional object will not be honored.

6. The method of claim 1, further comprising:
inserting an additional object into the document; and
in response to determining that the additional object is a non-CMYK object, automatically setting an object-level flag for the additional object so that an associated object-level color profile for the additional object will be honored.

7. The method of claim 1, wherein the output color profile is a color profile associated with a printer.

8. A computer-readable storage medium storing instructions that when executed by a computer cause the computer to perform a method for selectively converting color values for objects within a document based on color profiles, wherein a color profile defines a conversion for color values between a source color space and a destination color space, wherein the method comprises:
  determining whether an object-level color profile exists for an object in the document;

in response to determining that an object-level color profile does exist for the object in the document, determining whether an object-level flag for the object is set to honor the object-level color profile; and in response to determining that the object-level flag for the object is set to honor the object-level color profile, using the object-level color profile and an output color profile to convert color values for the object in the document.

9. The computer-readable storage medium of claim 8, further comprising:

in response to determining that a print-mode flag indicates that color values should be preserved for an additional set of objects comprising a plurality of CMYK objects, not converting the color values for the CMYK objects that have object-level flags set to not honor associated object-level color profiles and for the CMYK objects without object-level color profiles.

10. The computer-readable storage medium of claim 8, further comprising:

in response to determining that a print-mode flag indicates that color values should not be preserved for an additional set of objects comprising a plurality of CMYK objects, using a document-level CMYK color profile associated with the document and the output color profile to convert color values for the CMYK objects that have object-level flags set to not honor associated object-level color profiles and for the CMYK objects without object-level color profiles.

11. The computer-readable storage medium of claim 8, further comprising:

using the output color profile to convert color values for an additional object having an object-level color profile that differs from the output color profile.

12. The computer-readable storage medium of claim 8, further comprising:

inserting an additional object into the document; and in response to determining that the additional object is a CMYK object, automatically setting an object-level flag for the additional object so that an associated object-level color profile for the additional object will not be honored.

13. The computer-readable storage medium of claim 8, further comprising:

inserting an additional object into the document; and in response to determining that the additional object is a non-CMYK object, automatically setting an object-level flag for the additional object so that an associated object-level color profile for the additional object will be honored.

14. The computer-readable storage medium of claim 8, wherein the output color profile is a color profile associated with a printer.

15. An apparatus that selectively converts color values for objects within a document based on color profiles, wherein a color profile defines a conversion for color values between a source color space and a destination color space, wherein the apparatus comprises at least one processor and a memory, wherein the memory stores program instructions executable by the at least one processor to:

determine whether an object-level color profile exists for an object in the document;

in response to determining that an object-level color profile does exist for an object in the document, determine whether an object-level flag for the object is set to honor the object-level color profile; and in response to determining that the object-level flag for the object is set to honor the object-level color profile, use the object-level color profile and an output color profile to convert color values for the object in the document.

16. The apparatus of claim 15, wherein the program instructions are further executable by the at least one processor to:

in response to determining that a print-mode flag indicates color values should be preserved for an additional set of objects comprising a plurality of CMYK objects, not convert the color values for the CMYK objects that have object-level flags set to not honor associated object-level color profiles and for the CMYK objects without object-level color profiles.

17. The apparatus of claim 15, wherein the program instructions are further executable by the at least one processor to:

in response to determining that a print-mode flag indicates that color values should not be preserved for an additional set of objects comprising a plurality of CMYK objects, use a document-level CMYK color profile associated with the document and the output color profile to convert color values for the CMYK objects that have object-level flags set to not honor associated object-level color profiles and for the CMYK objects without object-level color profiles.

18. The apparatus of claim 15, wherein the program instructions are further executable by the at least one processor to:

use the output color profile to convert color values for an additional object having an object-level color profile that differs from the output color profile.

19. The apparatus of claim 15, the program instructions are further executable by the at least one processor to:

insert an additional object into the document; and in response to determining that the additional object is a CMYK object, automatically set an object-level flag for the additional object so that an associated object-level color profile for the additional object will not be honored.

20. The apparatus of claim 19, wherein the program instructions are further executable by the at least one processor to:

insert an additional object into the document; and in response to determining that the additional object is a non-CMYK object, automatically set an object-level flag for the additional object so that an associated object-level color profile for the additional object will be honored.

21. The apparatus of claim 15, wherein the output color profile is a color profile associated with a printer.

* * * * *